(12) United States Patent
Wu et al.

(10) Patent No.: US 10,772,081 B2
(45) Date of Patent: *Sep. 8, 2020

(54) AIRTIME-BASED PACKET SCHEDULING FOR WIRELESS NETWORKS

(71) Applicant: Extreme Networks, Inc., San Jose, CA (US)

(72) Inventors: Peter Wu, Saratoga, CA (US); Sreekanth Reddy, Edison, NJ (US); Jianlin Zeng, San Jose, CA (US); Changming Liu, Cupertino, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,577

(22) Filed: Feb. 26, 2019

(65) Prior Publication Data

US 2019/0261339 A1    Aug. 22, 2019

Related U.S. Application Data

(63) Continuation of application No. 15/865,027, filed on Jan. 8, 2018, now Pat. No. 10,219,254, which is a (Continued)

(51) Int. Cl.
*H04L 12/26* (2006.01)
*H04W 72/04* (2009.01)
(Continued)

(52) U.S. Cl.
CPC ......... *H04W 72/0406* (2013.01); *H04L 47/24* (2013.01); *H04L 47/32* (2013.01);
(Continued)

(58) Field of Classification Search
None
See application file for complete search history.

(56) References Cited

U.S. PATENT DOCUMENTS 5,471,671 A   11/1995 Wang et al.
5,697,059 A   12/1997 Carney
(Continued)

FOREIGN PATENT DOCUMENTS

CN   1642143 B   7/2005
EP   0940999 A2   9/1999
(Continued)

OTHER PUBLICATIONS

Chirumamilla, Mohan K. et al., "Agent Based Intrustion Detection and Response System for Wireless LANs," CSE Conference and Workshop Papers, Paper 64, Jan. 1, 2003.
(Continued)

*Primary Examiner* — Zewdu A Beyen
(74) *Attorney, Agent, or Firm* — Sterne, Kessler, Goldstein & Fox P.L.L.C.

(57) ABSTRACT

Airtime usage may be used as a factor in controlling network traffic flow to and from client devices via a wireless network interface. Received packets or other data are assigned to a quality of service profile. Additionally, a cost value for communicating the received data is determined at least in part based on an actual or estimated airtime usage for the received packet. The cost value is used to allocate wireless network airtime to data. The allocation of wireless network airtime may be varied dynamically based on operating conditions. The cost value may be based on factors including the airtime used to communicate data; whether the data is a retransmission; and wireless network overhead. The cost value of data may also be different depending on whether the data is being sent from a client device or to a client device.

20 Claims, 2 Drawing Sheets

Related U.S. Application Data continuation of application No. 15/243,720, filed on Aug. 22, 2016, now Pat. No. 9,867,167, which is a continuation of application No. 14/250,294, filed on Apr. 10, 2014, now Pat. No. 9,572,135, which is a continuation of application No. 13/938,159, filed on Jul. 9, 2013, now Pat. No. 8,730,931, which is a continuation of application No. 12/356,886, filed on Jan. 21, 2009, now Pat. No. 8,483,194.

(51) Int. Cl.
| | |
|---|---|
| *H04W 72/12* | (2009.01) |
| *H04W 28/02* | (2009.01) |
| *H04W 24/08* | (2009.01) |
| *H04L 12/851* | (2013.01) |
| *H04L 12/823* | (2013.01) |

(52) U.S. Cl.
CPC ....... *H04W 24/08* (2013.01); *H04W 28/0205* (2013.01); *H04W 72/1236* (2013.01); *H04W 72/1257* (2013.01)

(56) References Cited

U.S. PATENT DOCUMENTS

| | | | |
|---|---|---|---|
| 5,726,984 A | 3/1998 | Kubler et al. | |
| 5,956,643 A | 9/1999 | Benveniste | |
| 6,061,799 A | 5/2000 | Eldridge et al. | |
| 6,112,092 A | 8/2000 | Benveniste | |
| 6,154,655 A | 11/2000 | Borst et al. | |
| 6,201,792 B1 | 3/2001 | Lahat | |
| 6,233,222 B1 | 5/2001 | Wallentin | |
| 6,314,294 B1 | 11/2001 | Benveniste | |
| 6,473,413 B1 | 10/2002 | Chiou et al. | |
| 6,496,699 B2 | 12/2002 | Benveniste | |
| 6,519,461 B1 | 2/2003 | Andersson et al. | |
| 6,628,623 B1 | 9/2003 | Noy | |
| 6,628,938 B1 | 9/2003 | Rachabathuni et al. | |
| 6,636,498 B1 | 10/2003 | Leung | |
| 6,775,549 B2 | 8/2004 | Benveniste | |
| 6,865,393 B1 | 3/2005 | Baum et al. | |
| 6,957,067 B1 | 10/2005 | Iyer et al. | |
| 7,002,943 B2 | 2/2006 | Bhagwat et al. | |
| 7,057,566 B2 | 6/2006 | Theobold | |
| 7,085,224 B1 | 8/2006 | Oran | |
| 7,085,241 B1 | 8/2006 | O'Neill et al. | |
| 7,130,629 B1 | 10/2006 | Leung et al. | |
| 7,154,874 B2 | 12/2006 | Bhagwat et al. | |
| 7,164,667 B2 | 1/2007 | Rayment et al. | |
| 7,174,170 B2 | 2/2007 | Steer et al. | |
| 7,177,646 B2 | 2/2007 | O'Neill et al. | |
| 7,181,530 B1 | 2/2007 | Halasz et al. | |
| 7,216,365 B2 | 5/2007 | Bhagwat et al. | |
| 7,224,697 B2 | 5/2007 | Banerjea et al. | |
| 7,251,238 B2 | 7/2007 | Joshi et al. | |
| 7,336,670 B1 | 2/2008 | Calhoun | |
| 7,339,914 B2 | 3/2008 | Bhagwat et al. | |
| 7,346,338 B1 | 3/2008 | Calhoun et al. | |
| 7,366,894 B1 | 4/2008 | Kalimuthu et al. | |
| 7,369,489 B1 | 5/2008 | Bhattacharya et al. | |
| 7,370,362 B2 | 5/2008 | Olson et al. | |
| 7,440,434 B2 | 10/2008 | Chaskar et al. | |
| 7,512,379 B2 | 3/2009 | Nguyen | |
| 7,536,723 B1 | 5/2009 | Bhagwat et al. | |
| 7,562,384 B1 | 7/2009 | Huang | |
| 7,593,356 B1 | 9/2009 | Friday et al. | |
| 7,656,822 B1 | 2/2010 | AbdelAziz et al. | |
| 7,706,789 B2 | 4/2010 | Qi et al. | |
| 7,716,370 B1 | 5/2010 | Devarapalli | |
| 7,751,393 B2 | 7/2010 | Chaskar et al. | |
| 7,768,952 B2 | 8/2010 | Lee | |
| 7,793,104 B2 | 9/2010 | Zheng et al. | |
| 7,804,808 B2 | 9/2010 | Bhagwat et al. | |
| 7,843,832 B2 | 11/2010 | Choi et al. | |
| 7,843,907 B1 | 11/2010 | Abou-Emara et al. | |
| 7,844,057 B2 | 11/2010 | Meier et al. | |
| 7,856,209 B1 | 12/2010 | Rawat | |
| 7,971,185 B2 | 4/2011 | Chawla et al. | |
| 7,949,342 B2 | 5/2011 | Cuffaro et al. | |
| 7,961,725 B2 | 6/2011 | Nagarajan et al. | |
| 7,970,894 B1 | 6/2011 | Patwardhan | |
| 8,000,308 B2 | 8/2011 | Dietrich et al. | |
| 8,069,483 B1 | 11/2011 | Matlock | |
| 8,219,688 B2 | 7/2012 | Wang | |
| 8,249,606 B1 | 8/2012 | Neophytou et al. | |
| 8,493,918 B2 | 7/2013 | Karaoguz et al. | |
| 8,553,612 B2 | 10/2013 | Alexandre et al. | |
| 8,789,191 B2 | 7/2014 | Bhagwat et al. | |
| 8,824,448 B1 | 9/2014 | Narayana et al. | |
| 8,861,514 B1 * | 10/2014 | Lin ....................... H04L 47/527 370/230 |
| 8,948,046 B2 | 2/2015 | Kang et al. | |
| 8,953,453 B1 | 2/2015 | Xiao et al. | |
| 9,003,527 B2 | 4/2015 | Bhagwat et al. | |
| 2001/0006508 A1 | 7/2001 | Pankaj et al. | |
| 2002/0012320 A1 | 1/2002 | Ogier et al. | |
| 2002/0021689 A1 | 2/2002 | Robbins et al. | |
| 2002/0041566 A1 | 4/2002 | Yang et al. | |
| 2002/0071422 A1 | 6/2002 | Amicangioli | |
| 2002/0091813 A1 | 7/2002 | Lamberton et al. | |
| 2002/0114303 A1 | 8/2002 | Crosbie et al. | |
| 2002/0116463 A1 | 8/2002 | Hart | |
| 2002/0128984 A1 | 9/2002 | Mehta et al. | |
| 2003/0005100 A1 | 1/2003 | Barnard et al. | |
| 2003/0039212 A1 | 2/2003 | Lloyd et al. | |
| 2003/0084104 A1 | 5/2003 | Salem et al. | |
| 2003/0087629 A1 | 5/2003 | Juitt | |
| 2003/0104814 A1 | 6/2003 | Gwon et al. | |
| 2003/0129988 A1 | 7/2003 | Lee et al. | |
| 2003/0145091 A1 | 7/2003 | Peng et al. | |
| 2003/0179742 A1 | 9/2003 | Ogier et al. | |
| 2003/0198207 A1 | 10/2003 | Lee et al. | |
| 2004/0003285 A1 | 1/2004 | Whelan et al. | |
| 2004/0013118 A1 | 1/2004 | Borella | |
| 2004/0022222 A1 | 2/2004 | Clisham | |
| 2004/0054774 A1 | 3/2004 | Barber et al. | |
| 2004/0064467 A1 | 4/2004 | Kola et al. | |
| 2004/0077341 A1 | 4/2004 | Chandranmenon et al. | |
| 2004/0103282 A1 | 5/2004 | Meier et al. | |
| 2004/0109466 A1 | 6/2004 | Van Ackere et al. | |
| 2004/0162037 A1 | 8/2004 | Shpak | |
| 2004/0185876 A1 | 9/2004 | Groenendaal et al. | |
| 2004/0192312 A1 | 9/2004 | Li et al. | |
| 2004/0196977 A1 | 10/2004 | Johnson et al. | |
| 2004/0236939 A1 | 11/2004 | Watanabe et al. | |
| 2004/0255028 A1 | 12/2004 | Chu et al. | |
| 2005/0053003 A1 | 3/2005 | Cain et al. | |
| 2005/0074015 A1 | 4/2005 | Chari et al. | |
| 2005/0085235 A1 | 4/2005 | Park et al. | |
| 2005/0099983 A1 | 5/2005 | Nakamura et al. | |
| 2005/0122946 A1 | 6/2005 | Won | |
| 2005/0154774 A1 | 7/2005 | Giaffreda et al. | |
| 2005/0207417 A1 | 9/2005 | Ogawa et al. | |
| 2005/0259682 A1 | 11/2005 | Yosef et al. | |
| 2005/0262266 A1 | 11/2005 | Wiberg et al. | |
| 2005/0265288 A1 | 12/2005 | Liu et al. | |
| 2005/0266848 A1 | 12/2005 | Kim | |
| 2006/0010250 A1 | 1/2006 | Eisl et al. | |
| 2006/0013179 A1 | 1/2006 | Yamane | |
| 2006/0026289 A1 | 2/2006 | Lyndersay et al. | |
| 2006/0062250 A1 | 3/2006 | Payne, III | |
| 2006/0107050 A1 | 5/2006 | Shih | |
| 2006/0117018 A1 | 6/2006 | Christiansen et al. | |
| 2006/0140123 A1 | 6/2006 | Conner et al. | |
| 2006/0146748 A1 | 7/2006 | Ng et al. | |
| 2006/0146846 A1 | 7/2006 | Yarvis et al. | |
| 2006/0165015 A1 | 7/2006 | Melick et al. | |
| 2006/0187949 A1 | 8/2006 | Seshan et al. | |
| 2006/0221920 A1 | 10/2006 | Gopalakrislinan et al. | |
| 2006/0233128 A1 | 10/2006 | Sood et al. | |
| 2006/0234701 A1 | 10/2006 | Wang et al. | |
| 2006/0245442 A1 | 11/2006 | Srikrishna et al. | |
| 2006/0251256 A1 | 11/2006 | Asokan et al. | |

(56) References Cited

U.S. PATENT DOCUMENTS

| | | |
|---|---|---|
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0030826 A1 | 2/2007 | Zhang et al. |
| 2007/0049323 A1 | 3/2007 | Wang et al. |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0150720 A1 | 6/2007 | Oh et al. |
| 2007/0153697 A1 | 7/2007 | Kwan et al. |
| 2007/0153741 A1 | 7/2007 | Blanchette et al. |
| 2007/0156804 A1 | 7/2007 | Mo |
| 2007/0160017 A1 | 7/2007 | Meier et al. |
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0206552 A1 | 9/2007 | Yaqub et al. |
| 2007/0247303 A1 | 10/2007 | Payton |
| 2007/0248014 A1 | 10/2007 | Xie |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka et al. |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1 | 4/2008 | Chen et al. |
| 2008/0095184 A1* | 4/2008 | Yashima ............... H04L 47/10 370/450 |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0151751 A1 | 6/2008 | Ponnuswamy et al. |
| 2008/0159128 A1 | 7/2008 | Shaffer |
| 2008/0159135 A1 | 7/2008 | Caram |
| 2008/0170527 A1 | 7/2008 | Lundsgaard et al. |
| 2008/0186896 A1 | 8/2008 | Fanfelle et al. |
| 2008/0186932 A1 | 8/2008 | Do et al. |
| 2008/0194271 A1 | 8/2008 | Bedekar et al. |
| 2008/0207215 A1 | 8/2008 | Chu et al. |
| 2008/0209186 A1 | 8/2008 | Boden et al. |
| 2008/0212562 A1 | 9/2008 | Bedekar et al. |
| 2008/0219286 A1 | 9/2008 | Ji et al. |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1 | 2/2009 | da Costa et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0183164 A1* | 7/2009 | Carlstrom ............... H04L 47/10 718/103 |
| 2009/0197597 A1 | 8/2009 | Kotecha |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0303883 A1 | 12/2009 | Kucharczyk et al. |
| 2009/0310557 A1 | 12/2009 | Shinozaki |
| 2010/0020753 A1 | 1/2010 | Fulknier et al. |
| 2010/0046368 A1 | 2/2010 | Kaempfer et al. |
| 2010/0057930 A1 | 3/2010 | DeHaan |
| 2010/0061234 A1 | 3/2010 | Pai et al. |
| 2010/0067379 A1 | 3/2010 | Zhao et al. |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0195585 A1 | 8/2010 | Horn et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1 | 3/2011 | Jetcheva et al. |
| 2011/0055326 A1 | 3/2011 | Michaelis et al. |
| 2011/0055928 A1 | 3/2011 | Brindza |
| 2011/0058524 A1 | 3/2011 | Hart et al. |
| 2011/0064065 A1 | 3/2011 | Nakajima et al. |
| 2011/0085464 A1 | 4/2011 | Nordinark et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2011/0292897 A1 | 12/2011 | Wu et al. |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0227306 A1 | 8/2013 | Santos et al. |
| 2013/0230020 A1 | 9/2013 | Backes |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1732276 B1 | 12/2006 |
| EP | 1771026 A1 | 4/2007 |
| EP | 1490773 B1 | 1/2013 |
| WO | WO-0059251 A1 | 10/2000 |
| WO | WO-0179992 A2 | 10/2001 |
| WO | WO-2004042971 A1 | 5/2004 |
| WO | WO-2006129287 | 12/2006 |
| WO | WO-2009141016 | 11/2009 |

OTHER PUBLICATIONS

Clausen, T., et al., "Optimized Link State Routing Protocol (OLSR)," Network Working Group, pp. 1-71, Oct. 2003.
Craiger, J. Philip, "802.11, 802.1x, and Wireless Security," SANS Institute InfoSec Reading Room, Jun. 23, 2002.
European Patent Application No. 11823931.8, Search Report dated Aug. 29, 2016.

(56) References Cited

OTHER PUBLICATIONS

European Patent Application No. 12879114.2, Search Report dated Jan. 21, 2016.
Finlayson, Ross et al., "A Reverse Address Resolution Protocol," Network Working Group, Request for Comments: 903 (RFC 903), Jun. 1984.
He, Changhua et al., "Analysis of the 802.11i 4-Way Handshake," Proceedings of the 3rd ACM Workshop on Wireless Security, pp. 43-50, Oct. 2004.
International Application No. PCT/US2008/061674, International Search Report and Written Opinion dated Oct. 14, 2008.
International Application No. PCT/US2011/047591, International Search Report and Written Opinion dated Dec. 19, 2011.
International Application No. PCT/US2012/059093, International Search Report and Written Opinion dated Jan. 4, 2013.
Lee, Jae Woo et al., "z2z: Discovering Zeroconf Services Beyond Local Link," 2007 IEEE Globecom Workshops, pp. 1-7, Nov. 26, 2007.
Perkins, C., et al., Ad hoc On-Demand Distance Vector (AODV) Routing, Network Working Group, pp. 1-35, Oct. 2003.
Wu, Haitao of al.,"Layer 2.5 SoftMAC: End-System Based Media Streaming Support on Home Networks," IEEE Global Telecommunications Conference (GLOBECOM '05), vol. 1, pp. 235-239, Nov. 2005.
IEEE Computer Society, "IEEE Std. 802.11i—Part 11: Wireless LAN Medium Access Control (MAC) and Physical Layer (PHY) Specifications—Amendment 6: Medium Access Control (MAC) Security Enhancements," Section H.4.1, pp. 165-166, Jul. 23, 2014.

\* cited by examiner

AIRTIME-BASED PACKET SCHEDULING FOR WIRELESS NETWORKS

CROSS REFERENCE TO RELATED APPLICATIONS

This application is a continuation of U.S. patent application Ser. No. 15/865,027, filed on Jan. 8, 2018, now U.S. Pat. No. 10,219,254, which is a continuation of U.S. patent application Ser. No. 15/243,720, filed on Aug. 22, 2016, now U.S. Pat. No. 9,867,167, which is a continuation of U.S. patent application Ser. No. 14/250,294, filed on Apr. 10, 2014, now U.S. Pat. No. 9,572,135, which is a continuation of U.S. patent application Ser. No. 13/938,159, filed on Jul. 9, 2013, now U.S. Pat. No. 8,730,931, which is a continuation of U.S. patent application Ser. No. 12/356,886, filed on Jan. 21, 2009, now U.S. Pat. No. 8,483,194, all of which are incorporated by reference herein.

BACKGROUND

This application is related to the field of wireless networking devices, and in particular to systems and methods for controlling network traffic to and from clients. Networking devices enable data communications between two or more devices, referred to generally as clients. Data communications may be conducted over wired and/or wireless network interfaces. Typically, data is partitioned into packets, which are then communicated via one or more networking devices to one or more destination clients.

Networking devices may handle packets generated by and directed to large numbers of clients over the same interface. The bandwidth or data communications capacity of networking devices limits the amount of data or the rate of network packets passing through network devices. The limits on bandwidth are particularly acute in network devices including wireless network interfaces. If the bandwidth limit of a networking device is reached or exceeded by its client's network traffic, packets may be delayed or dropped. Depending on the type of data being communicated over the network, these traffic disruptions caused by reaching or exceeding bandwidth limit of a networking device may adversely affect the performance of applications on a client. For example, clients receiving voice or streaming video data may be adversely affected by even small delays or losses of packets.

Because of the limits on network device bandwidth, many network devices include quality of service (QoS) functionality. Quality of service functionality allows network administrators to provide different priority for packets or other network data based on factors such as the associated client, user, client application, or data flow. Typically, users, clients, or applications are assigned to different quality of service profiles. Each quality of service profile specifies a quality of service parameters to associated packets or other network data. Networking devices use the scheduling weights to prioritize packet traffic and potentially guarantee a minimum level of performance to some or all of the network data flows.

However, typical quality of service functionality does not take into consideration performance issues unique to wireless network interfaces. For example, many wireless network interfaces support multiple wireless networking standards, such as IEEE 802.11a, 802.11b, 802.11g, and 802.11n. This allows the networking device to support legacy clients using slower (e.g. relatively low data-rate) standards, such as 802.11b, as well as newer clients capable of communicating via faster (e.g. relatively high data-rate) standards, such as 802.11n. When a networking device is operating in a mixed mode and communicating with clients via multiple standards, the clients using slower data rates, such as clients using older standards or newer standards at lower data rates, for example due to lower signal strength or radio interference, will consume a disproportionate amount of airtime from the wireless network interface. As a result of this disproportionate airtime usage, the performance of other clients attempting to utilize faster data rates will be degraded substantially.

SUMMARY

An embodiment of the invention includes airtime usage as a factor in controlling network traffic flow to and from client devices via a wireless network interface. In an embodiment, packets or other data received via a wired or wireless network interface and directed to a client device or received from a client via a wireless network interface are assigned to a quality of service profile. Additionally, a cost value for communicating the packet or other data is determined at least in part based on an actual or estimated airtime usage for the packet to be communicated to or from the client via a wireless network interface. The cost value is used to allocate wireless network airtime to clients. In a further embodiment, the consumption of wireless network airtime may be varied dynamically based on operating conditions.

In an embodiment, the cost value may be based on factors including the actual or estimated airtime used to communicate the packet via the wireless network interface; whether the packet or other data is a retransmission of a previous packet or other data; and actual or estimated wireless network overhead. The cost value of a packet may also be different depending on whether the packet is being sent from a client device or to a client device.

In an embodiment, a token bucket scheduling system is used to allocate wireless network bandwidth based on received packets' cost values and token balances associated with quality of service profiles. In a further embodiment, packets or other data received from a client device via a wireless network interface may be dropped or discarded if a queue associated with a quality of service is full.

DETAILED DESCRIPTION

Figure 1:
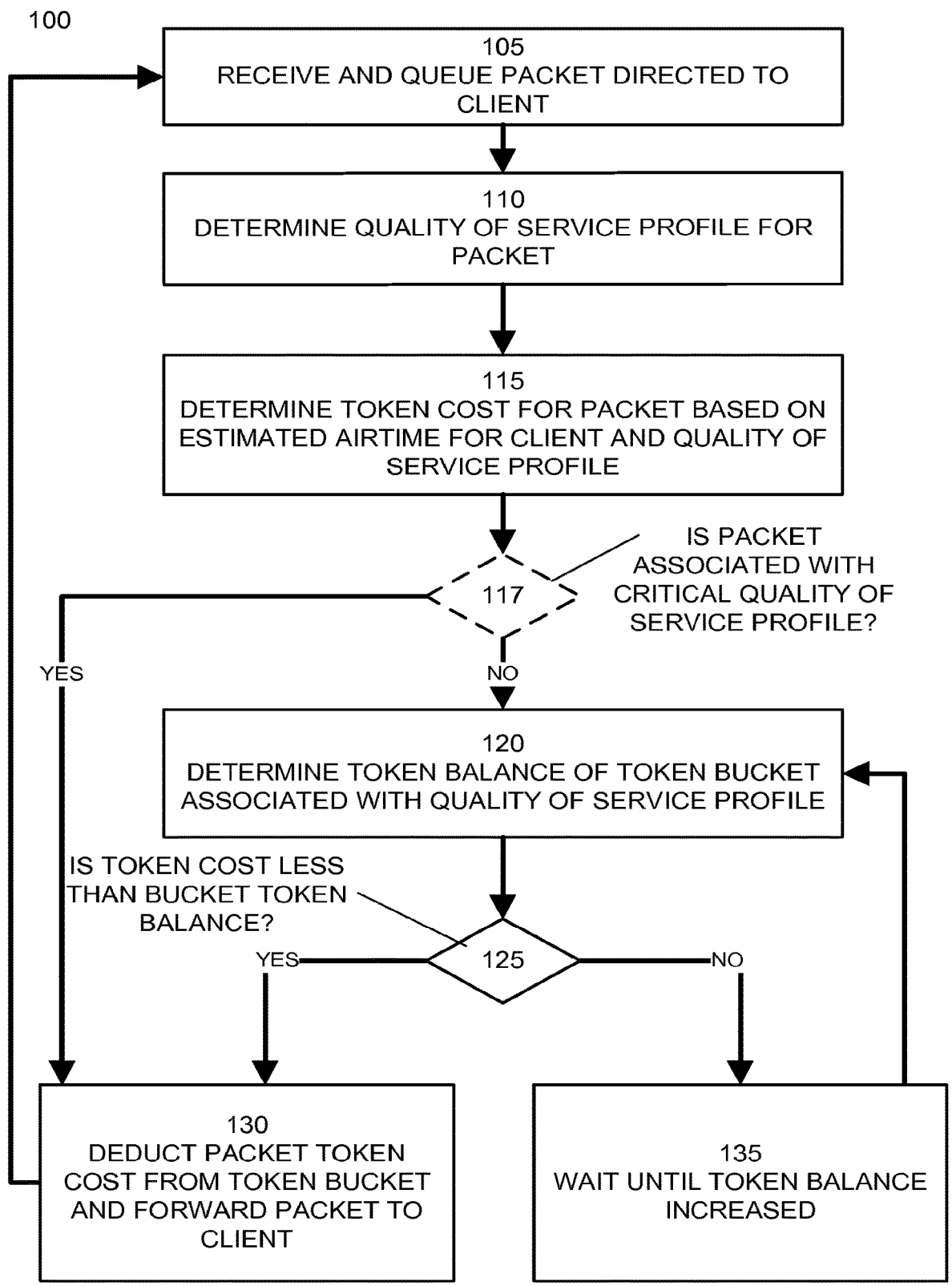
FIG. 1 illustrates a flowchart of an example of a method of scheduling downlink network traffic according to an embodiment of the invention.

FIG. 1 illustrates a flowchart 100 of an example of a method of scheduling downlink network traffic according to an embodiment of the invention. In this application, downlink network traffic refers to network traffic received by a network device via a wired or wireless network connection and directed to a client device via a wireless network connection. In step 105, a packet or other type of network data is received by a network device. In an embodiment, the packet is directed to a client device in direct or indirect communication with the network device via a wireless network connection. For example, the network device may be adapted to communicate the packet directly to the client device via a wireless network connection or to one or more additional network devices via the wireless network connection, which in turn communicate the packet to the client device via a wired or wireless network connection.

Step 110 determines a quality of service profile to be associated with the received packet. Embodiments of step 110 may assign a quality of service profile to packets based on the packet source, the packet destination, a user identity or user class associated with the packet source and/or packet destination, the contents or control data associated with a packet, a source or client application associated with a packet, and/or a data flow associated with the packet. The set of quality of service profiles may be specified by network administrators. As described in detail below, each quality of service profile is assigned a scheduling weight and a scheduling mode used to prioritize packets. In further embodiments, a quality of service profile may include a per-user rate limit.

Step 115 determines a token cost for the received packet based on factors including an estimated airtime for the packet and the quality of service profile. In an embodiment, packets are assigned a cost value, referred to as a token cost. The token cost represents the relative amount of network performance consumed by communicating the associated packet towards the intended destination by the network device.

Embodiments of step 115 take into account at least an estimated packet airtime to determine the token cost of the received packet. In an embodiment, step 115 estimates the airtime to communicate the received packet from the network device to the client based on the airtime required by previous packets to the same client, similar clients, and/or clients assigned to the same quality of service profile. For example, a running average of the airtime consumed by one or more of the most-recently sent packets to the same client may be used to determine at least a portion of the estimated packet airtime for the currently received packet.

In a further embodiment, the average airtime of recently sent packets is weighted or divided by their respective packet sizes to determine an average airtime consumed per data unit, such as average airtime consumed per byte. This average airtime consumed per data unit may then be scaled or weighted according the size of the received packet to determine at least a portion of the estimated airtime for the currently received packet. This enables the token cost of a packet to increase with the packet size, as larger packets consume more network bandwidth.

In addition to estimating the airtime consumed in transmitting the packet, an embodiment of step 115 may also include other factors in determining the token cost of a packet. The token cost or total estimated airtime may include an estimated airtime for transmitting a packet to the client, the actual, estimated, or prorated airtime used for retransmitting packets that were previously unsuccessfully transmitted, and/or some or all of the network overhead.

Optional decision block 117 may determine if the packet is associated with a critical quality of service profile. In an embodiment, users, user groups, and/or the types of applications associated with a packet may be assigned to a critical quality of service profile if any delay in forwarding the packet is unacceptable. For example, packets from voice-over IP (VOIP) and live video applications may be assigned to a critical quality of service profile. If a packet is associated with a critical quality of service profile, method 100 proceeds directly from decision block 117 to step 130 to forward the packet to its destination. However, as described in detail below, step 130 may deduct the token cost of this critical packet from a token bucket associated with the application, user group, or individual user. This has the effect of potentially limiting the airtime of any future non-critical packets from the same application, user group, or user.

Step 120 determines a token balance of a token bucket associated with the selected quality of service profile. In an embodiment, each quality of service profile is associated with its own token bucket. A token bucket is a data structure including a token balance value. The token balance value represents the unused proportion of the network bandwidth assigned to a quality of service profile. Token costs and token balance values may be expressed in arbitrary units.

In an embodiment, the token balance value of each token bucket is periodically increased or incremented, representing additional network bandwidth allocated to the associated quality of service profile for a period of time. In an embodiment, a scheduling weight associated with a quality of service profile is used to determine the rate or amount by which the token balance value of the token bucket is increased. For example, the token balance value of a token bucket associated with a higher priority quality of service profile may be incremented more frequently and/or by larger amounts. This has the effect of allocating more network bandwidth to packets associated with the high priority quality of service profile. In an alternate embodiment, each token bucket has its token balance value incremented by the same amount and at the same frequency.

In further embodiments, the range of the token balance value of each token bucket may be limited between a maximum token balance value and/or a minimum token balance value. The token increment value, token balance incrementing rate, and the minimum and maximum token balance limits of each token bucket may be specified based on the associated quality of service profile and optionally one or more other quality of service profiles. In a further embodiment, the token increment value, token balance incrementing rate, the minimum and maximum token balance limits of each token bucket, or any other factor affecting the allocation of wireless networking airtime may be dynamically specified based on the performance of the wireless network interface.

Decision block 125 compares the token cost of the received packet with the token balance value of the associated token bucket. If the token cost of the received packet is less than the token balance of the token bucket corresponding with the assigned quality of service profile, then method 100 proceeds to step 130.

Step 130 deducts the token cost from the token balance of the associated token bucket and forwards the packet to the client via the wireless network interface. By deducting the token cost from the token balance of the token bucket, the token balance reflects the relative proportion of the wireless network interface's bandwidth that has been used by the assigned quality of service profile. The packet may be communicated to the client device using any wireless networking standard or technique known in the art. In a further embodiment, the network device may communicate with multiple clients using different wireless networking standards or techniques, depending on the client capabilities and/or operating conditions. Following step 130, flowchart 100 optionally proceeds back to step 105 to await the receipt of another packet directed to the same or a different client.

In a further embodiment, step 130 deducts the token cost from the token balance value of the associated token bucket in two phases. First, step 130 deducts the token cost based at least partly on an estimated airtime for the received packet. Step 130 then forwards the packet to the client device via the wireless network interface. Additionally, step 130 monitors the transmission of this packet towards the client to determine its actual airtime usage. Step 130 then uses this actual airtime usage to determine a revised token cost for the received packet. Step 130 then subtracts the difference between the revised token cost and the original token cost of the packet from the token balance value of the token bucket. This adjustment may increase or decrease the token balance value of the token bucket, depending on whether the actual airtime usage of the packet is less than or greater than the estimated airtime, respectively.

Returning to decision block 125, if the token cost of the received packet is greater than the token balance of the token bucket corresponding with the assigned quality of service profile, then method 100 proceeds to step 135. Step 135 queues the received packet associated with this quality of service profile until the token balance of its associated token bucket is increased. Following the increase of the token balance of the token bucket associated with the quality of service profile assigned to the received packet, an embodiment of method 100 proceeds back to step 120. Steps 120, 125, and step 135 may be repeated one or more times until the token cost of the queued packet is less than the token balance of the token bucket. In an embodiment, while a packet is queued in step 135, other packets may be received and processed according to flowchart 100.

Although described with reference to downlink network traffic from a network device to a client device, embodiments of the method of flowchart 100 may also be applied to scheduling uplink network traffic from a client device to a network device via a wireless network interface. In this embodiment, the method of flowchart 100 operates in a similar manner as described above. However, the actual airtime of the received uplink packet is already known, eliminating the need to use an estimated airtime to determine at least part of the token cost.

As described above, a packet may be assigned to a critical quality of service profile if any delay in forwarding the packet is unacceptable. In an embodiment, step 130 deducts the token cost of these packets from the token balance of the associated token bucket, similar to other packets associated with non-critical quality of service profiles. However, because packets assigned to critical quality of service profiles bypass steps 120, 125, and 135, the token balance of a token bucket may become negative due to packets in critical quality of service profiles. In an embodiment, a negative token balance will not block further communications of packets associated with critical quality of service profiles. However, other packets associated with the same token bucket, such as packets for the same user, user group, and/or application, will be queued until the token balance of the token bucket increases. In a further embodiment, a token bucket may have a negative limit. When the token balance reaches the negative limit, packets associated with this token bucket may be dropped.

Although the flowchart 100 includes token costs and token buckets for controlling network traffic based at least in part on airtime usage, embodiments of the invention can include airtime usage as a factor controlling network traffic using any other network traffic shaping, bandwidth throttling, rate limiting, or quality of service technique known in the art.

Figure 2:
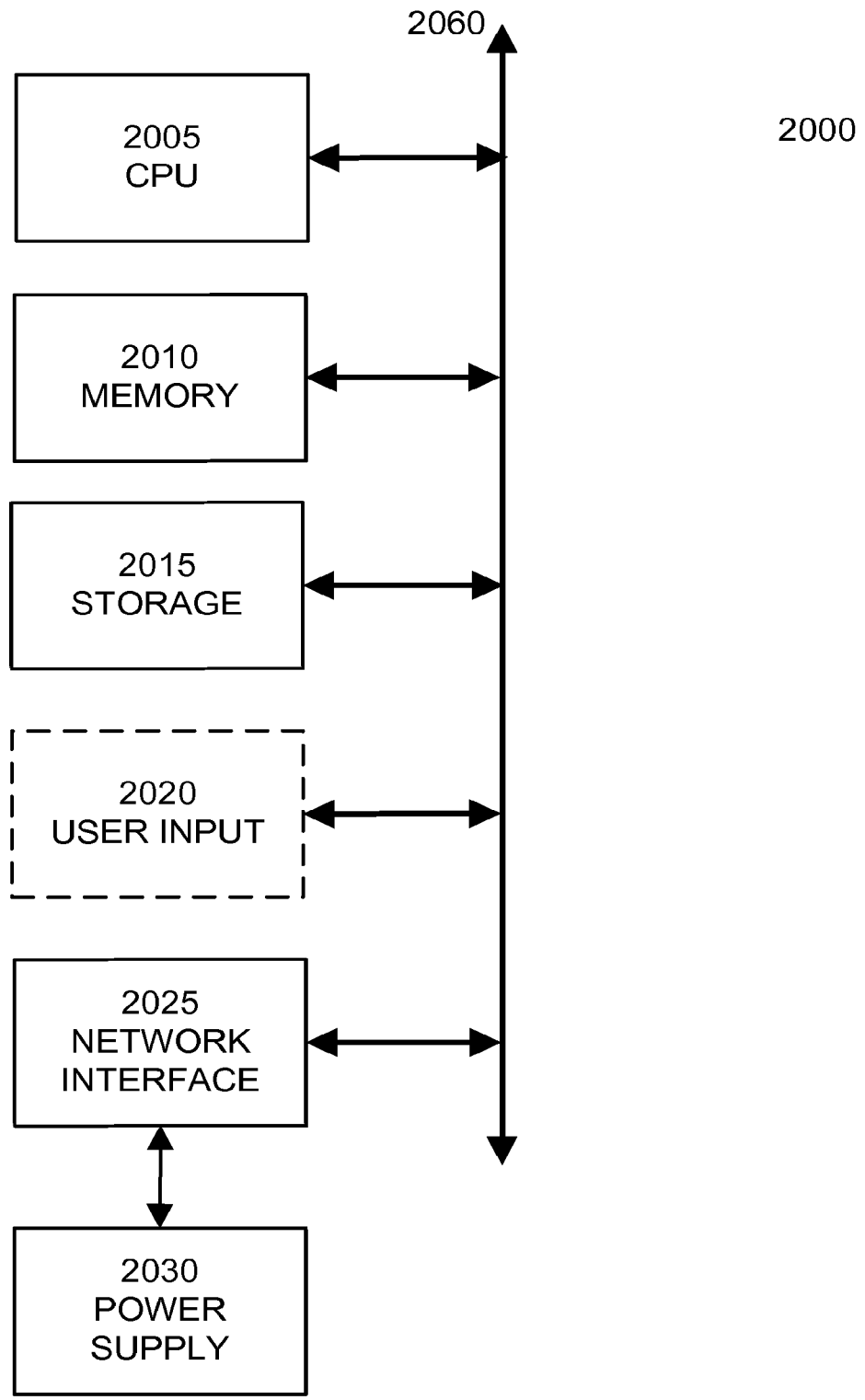
FIG. 2 illustrates a diagram of an example computer system suitable for implementing an embodiment of the invention.

FIG. 2 illustrates a diagram 2000 of an example computer system suitable for implementing an embodiment of the invention. FIG. 2 is a block diagram of a computer system, such as a personal computer or other digital device, suitable for practicing an embodiment of the invention. Embodiments of computer system may include dedicated networking devices, such as wireless access points, network switches, hubs, routers, hardware firewalls, network traffic optimizers and accelerators, network attached storage devices, and combinations thereof.

The diagram 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and the computer system may present a user interface to a user over a network, for example using a web page or network management protocol and network management software applications.

The diagram 2000 includes one or more network interfaces 2025 that allow computer system to communicate with other computer systems via an electronic communications network, and may include wired or wireless communication over local area networks and wide area networks such as the Internet. The computer system may support a variety of networking protocols at one or more levels of abstraction. For example, the computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system of the diagram 2000 may also include a wired networking interface, such as one or more Ethernet connections to communicate with other networking devices via local or wide-area networks. In a further embodiment, the computer system may be capable of receiving some or all of its required electrical power via the network interface 2025, for example using a wired networking interface power over Ethernet system.

The components of the computer system of the diagram 2000, including CPU 2005, memory 2010, data storage 2015, user input devices 2020, and network interface 2025 are connected via one or more data buses 2060. Additionally, some or all of the components of the computer system, including CPU 2005, memory 2010, data storage 2015, user input devices 2020, and network interface 2025 may be integrated together into one or more integrated circuits or integrated circuit packages. Furthermore, some or all of the components of the diagram 2000 may be implemented as application specific integrated circuits (ASICS) and/or programmable logic.

A power supply 2030 provides electrical power to the computer system of the diagram 2000. Power supply 2030 may be adapted to draw electrical power from a connection with an electrical power distribution grid. In an embodiment, power supply 2030 is connected with network interface 2025 to draw electrical power for the computer system from one or more wired network connections using a network power standard, such as IEEE 802.3af.

Further embodiments can be envisioned to one of ordinary skill in the art after reading the attached documents. For example, embodiments of the invention can be used with any number of network connections and may be added to any type of power supply in addition to the stacked network power supply illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   receiving first and second data packets as part of network traffic of a network destined for one or more wireless devices accessing the network through a wireless connection;
   determining a first quality of service (QoS) profile associated with the first data packet and a second (QoS) profile associated with the second data packet;
   determining a first token cost of transmitting the first data packet based on a first estimated airtime for transmitting the first data packet and a second token cost of transmitting the second data packet based on a second estimated airtime for transmitting the second data packets;
   determining a first token balance of the first (QoS) profile and a second token balance of the second (QoS) profile, the first and second token balances being an amount of network bandwidth of the network allocated to the first and second quality of service profiles, respectively;
   determining whether the first and second token costs exceed the first and second token balances, respectively;
   upon determining that the first token cost does not exceed the first token balance, deducting the first token cost from the first token balance and forwarding the first data packet to a wireless device of the one or more wireless devices;
   upon determining that the second token cost does not exceed the second token balance, deducting the second token cost from the second token balance and forwarding the second data packet to the wireless device;
   periodically increasing the first and second token balances, a first increase amount of the first token balance being greater than a second increase rate of the second token balance;
   monitoring a transmission of the first data packet to the wireless device to determine a first actual airtime usage; and
   updating the first token balance based on the first actual airtime usage.

2. The method of claim 1, further comprising revising the second token balance based on a second actual airtime usage.

3. The method of claim 1, wherein updating the first token balance based on the first actual airtime usage comprises:
   revising the first token cost based on the first actual airtime usage to determine a revised token cost;
   subtracting the first token cost from the revised token cost to calculate a difference; and
   subtracting the difference from the first token balance.

4. The method of claim 2, wherein updating the second token balance based on the second actual airtime usage comprises:
   monitoring a transmission of the second data packet to the wireless device to determine the second actual airtime usage;
   revising the token cost based on the second actual airtime usage to determine a revised token cost;
   subtracting the second token cost from the revised token cost to calculate a difference; and
   subtracting the difference from the second token balance.

5. The method of claim 1, wherein a first frequency of increasing the first token balance is greater than a second frequency of increasing the second token balance.

6. The method of claim 1, wherein the first token balance has a first maximum token balance limit and the second token balance has a second maximum limit lower than the first maximum token balance limit.

7. The method of claim 1, wherein determining the first QoS profile is based on a first wireless networking standard and determining the second QoS profile is based on a second wireless networking standard that supports a data communication speed slower than that of the first wireless networking standard.

8. A system, comprising:
   a processor;
   a network interface communicatively coupled to the processor; and
   memory communicatively coupled to the processor and network interface, wherein the memory is configured to store instructions that, when executed, cause the processor to:
   receive first and second data packets in a network;
   determine a first quality of service (QoS) profile associated with the first data packet and a second QoS profile associated with the second data packet;
   determine a first token cost of transmitting the first data packet based on a first estimated airtime for transmitting the first data packet and a second token cost of transmitting the second data packet based on a second estimated airtime for transmitting the second data packet;
   determine a first token balance of the first QoS profile and a second token balance of the second QoS profile, the first and second token balances being an amount of network bandwidth of the network allocated to the first and second QoS profiles, respectively;
   determine whether the first and second token costs exceed the first and second token balances, respectively;
   in response to determining that the first token cost does not exceed the first token balance:
      deduct the first token cost from the first token balance and forward the first data packet to a first wireless device;
      monitor a transmission of the first data packet to the first wireless device to determine a first actual airtime usage; and
      update the first token balance based on the first actual airtime usage;

in response to determining that the second token cost does not exceed the second token balance, deduct the second token cost from the second token balance and forward the second data packet to a second wireless device; and increase the first and second token balances, wherein a first increase amount of the first token balance is greater than a second increase amount of the second token balance.

9. The system of claim 8, wherein the instructions further cause the processor to update the second token balance based on a second actual airtime usage.

10. The system of claim 8, wherein to update the first token balance based on the first actual airtime usage, the memory is configured to store instructions that, when executed, cause the processor to:

revise the first token cost based on the first actual airtime usage to determine a revised token cost;

subtract the first token cost from the revised token cost to calculate a difference; and subtract the difference from the first token balance.

11. The system of claim 9, wherein to update the second token balance based on the second actual airtime usage, the memory is configured to store instruction that, when executed, cause the processor to:

monitor a transmission of the second data packet to the second wireless device to determine the second actual airtime usage;

revise the second token cost based on the second actual airtime usage to determine a revised token cost;

subtract the second token cost from the revised token cost to calculate a difference; and subtract the difference from the second token balance.

12. The system of claim 8, wherein a first frequency of increasing the first token balance is greater than a second frequency of increasing the second token balance.

13. The system of claim 8, wherein the first token balance has a first maximum token balance limit and the second token balance has a second maximum limit lower than the first maximum token balance limit.

14. The system of claim 8, wherein determining the first QoS profile is based on a first wireless networking standard used and determining the second QoS profile is based on a second wireless networking standard that supports a data communication speed slower than that of the first wireless networking standard.

15. A non-transitory computer readable storage medium having computer readable code thereon, the non-transitory computer readable medium including instructions for a computer system to perform operations comprising:

determining a first quality of service (QoS) profile associated with a first data packet and a second QoS profile associated with a second data packet in a network;

determining a first token cost of transmitting the first data packet based on a first estimated airtime and a second token cost of transmitting the second data packet based on a second estimated airtime;

determining a first token balance of the first QoS profile and a second token balance of the second QoS profile, wherein the first and second token balances are associated with an amount of network bandwidth allocated to the first and second QoS profiles, respectively;

determining whether the first and second token costs exceed the first and second token balances, respectively;

in response to determining that the first token cost does not exceed the first token balance, deducting the first token cost from the first token balance and forwarding the first data packet to a wireless device;

in response to determining that the second token cost does not exceed the second token balance, deducting the second token cost from the second token balance and forwarding the second data packet to the wireless device;

increasing the first and second token balances, wherein a first increase amount of the first token balance is greater than a second increase amount of the second token balance; and updating the first token balance comprising:

monitor a transmission of the first data packet to the wireless device to determine a first actual airtime usage:

determining a revised first token cost based on the first actual airtime usage;

subtracting the first token cost from the revised first token cost to calculate a first difference; and subtracting the first difference from the first token balance.

16. The non-transitory computer readable storage medium of claim 15, the instructions for the computer system to perform operations further comprising updating the second token balance based on a second actual airtime usage.

17. The non-transitory computer readable storage medium of claim 16, wherein updating the second token balance based on a second actual airtime usage comprises:

determining a revised second token cost based a second actual airtime usage;

subtracting the second token cost from the revised second token cost to calculate a second difference; and subtracting the second difference from the second token balance.

18. The non-transitory computer readable storage medium of claim 15, wherein a first frequency of increasing the first token balance is greater than a second frequency of increasing the second token balance.

19. The non-transitory computer readable storage medium, of claim 15, wherein the first token balance has a first maximum token balance limit and the second token balance has a second maximum limit lower than the first maximum token balance limit.

20. The non-transitory computer readable storage medium of claim 15, wherein determining the first QoS profile is based on a first wireless networking standard and determining the second QoS profile is based on a second wireless networking standard that supports a data communication speed slower than that of the first wireless networking standard.

* * * * *